(12) United States Patent
Matsunaga

(10) Patent No.: US 7,352,521 B2
(45) Date of Patent: Apr. 1, 2008

(54) IMAGE DISPLAY OPTICAL SYSTEM AND IMAGE DISPLAY APPARATUS

(75) Inventor: Motomi Matsunaga, Tochigi (JP)

(73) Assignee: Canon Kabushiki Kaisha, Ohta-ku, Tokyo (JP)

( * ) Notice: Subject to any disclaimer, the term of this patent is extended or adjusted under 35 U.S.C. 154(b) by 79 days.

(21) Appl. No.: 10/849,349

(22) Filed: May 18, 2004

(65) Prior Publication Data

US 2004/0233555 A1 Nov. 25, 2004

(30) Foreign Application Priority Data

May 19, 2003 (JP) .............................. 2003-140352

(51) Int. Cl.
*G02B 5/04* (2006.01)
(52) U.S. Cl. ...................... 359/834; 359/837; 359/850; 359/857; 353/28; 353/99
(58) Field of Classification Search .................. 353/81, 353/82; 345/32
See application file for complete search history.

(56) References Cited

U.S. PATENT DOCUMENTS 6,222,676 B1 * 4/2001 Togino et al. ............... 359/630
7,012,756 B2 * 3/2006 Takagi et al. ................ 359/631

2002/0039232 A1 * 4/2002 Takeyama ................... 359/566
2002/0167463 A1 * 11/2002 Inoguchi ........................ 345/8
2002/0180907 A1 * 12/2002 Imamura et al. ............ 349/112

FOREIGN PATENT DOCUMENTS

JP 7-333551 12/1995
JP 2000-131614 5/2000

OTHER PUBLICATIONS

English Abstract for Japanese Patent Application Laid-Open No. 2000-131614.
English Abstract for Japanese Patent Application Laid-Open No. 7-333551.

* cited by examiner

*Primary Examiner*—Stephone B. Allen
*Assistant Examiner*—Derek S. Chapel
(74) *Attorney, Agent, or Firm*—Morgan & Finnegan, L.L.P.

(57) ABSTRACT

An image display optical system which achieves a small size and display at a wide angle of view as well as maintains a required level of optical performance and allows suppression of occurrence of various aberrations at the same time. The optical system includes a first optical element and a second optical element in order from the side of an exit pupil of the optical system to the side of a display device. A combined negative optical power is provided by an emergent surface of the second optical element and an incident surface of the first optical element, and the optical system forms an intermediate image with the displaying luminous flux in the first optical element.

12 Claims, 4 Drawing Sheets

IMAGE DISPLAY OPTICAL SYSTEM AND IMAGE DISPLAY APPARATUS

BACKGROUND OF THE INVENTION

1. Field of the Invention

The present invention relates to an image display optical system which guides a luminous flux from a display device to an eye of an observer, and more particularly, to an optical system preferable for use in a head mounted display which is put on the head of an observer to enlargingly present an original image displayed on a display device to the observer.

2. Description of Related Art

Image display apparatuses of a head mount type (head mounted displays) have conventionally been known in which an image display device such as a CRT and an LCD is used and an original image displayed on the display device is enlargingly presented to an observer through a predetermined optical system.

Since such a head mounted display is put on the head of an observer, reductions in size and weight of the entire display are particularly needed. In addition, to produce a dynamic effect in a displayed image, an optical system used in the head mounted display needs to enlarge an original image displayed on the display device as much as possible for display at a wide angle of view and present the image at high resolution.

As a means for satisfying the needs, Japanese Patent Application Laid-Open No. H07 (1995)-333551, for example, has proposed the use of a decentered prism including a plurality of surfaces for an optical system which guides a luminous flux from a display device to an eye of an observer in which internal reflection in the decentered prism is used to fold an optical path to reduce the size of the optical system.

As a means for enlargingly displaying an original image displayed on a display device at a wide angle of view through an optical system which can be provided in a relatively short optical path, an intermediate image is effectively formed in the optical path between the display device and an eye of an observer. For example, Japanese Patent Application Laid-Open No. 2000-131614 has disclosed a head mounted display having an optical system which forms an intermediate image in an optical path.

When a head mounted display which achieves a small size and image display at a wide angle of view at the same time is to be formed by combining the aforementioned means, however, the following problem arises. Specifically, to form an intermediate image for display at a wide angle of view, it is necessary to provide a relay optical system for producing the intermediate image and an ocular optical system for presenting the intermediate image to an observer in a path between a display device and an eye of the observer. This complicates the required optical system to cause an increased size.

To solve the problem, an effective approach is to use a decentered prism to arrange the relay optical system and the ocular optical system in small space. In optical design using the decentered prism, a reduction in size is effectively possible by using a single surface of the prism a plurality of times in an optical path formed in the prism and increasing an optical power of each optical surface constituting the prism, although it is difficult to ensure optical performance as an image display apparatus and to suppress occurrence of various aberrations.

SUMMARY OF THE INVENTION

It is an object of the present invention to provide an image display optical system achieving a small size and display at a wide angle of view while a required level of optical performance is ensured and occurrence of various types of optical aberration can be suppressed at the same time.

To achieve the aforementioned object, according to one aspect, the present invention provides an optical system which guides a displaying luminous flux from a display device to an eye of an observer, comprising a first optical element and a second optical element in order from the side of an exit pupil of the optical system to the side of the display device. A combined optical power provided by an emergent surface of the second optical element and an incident surface of the first optical element is a negative optical power, and optical system forms an intermediate image with the display luminous flux in the first optical element.

These and other characteristics of the image display optical system and an image display apparatus having the image display optical system according to the present invention will be apparent from the following description of specific embodiments with reference to the drawings.

DETAILED DESCRIPTION OF THE PREFERRED EMBODIMENTS

Embodiments of the present invention are hereinafter described with reference to the drawings.

Embodiment 1

Figure 1:
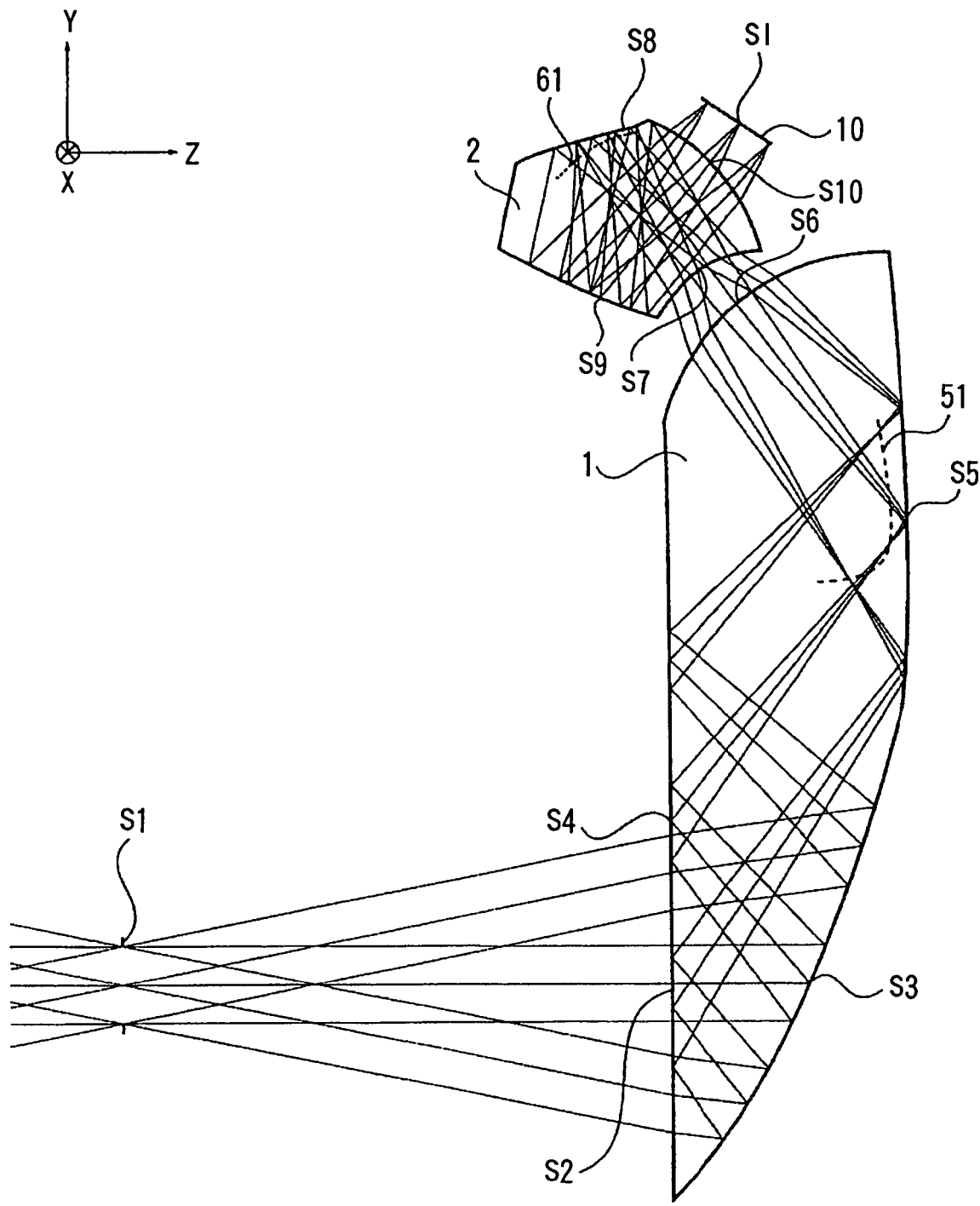
FIG. 1 is a section view of an optical system for a head mounted display according to Embodiment 1 of the present invention.
Figure 4:
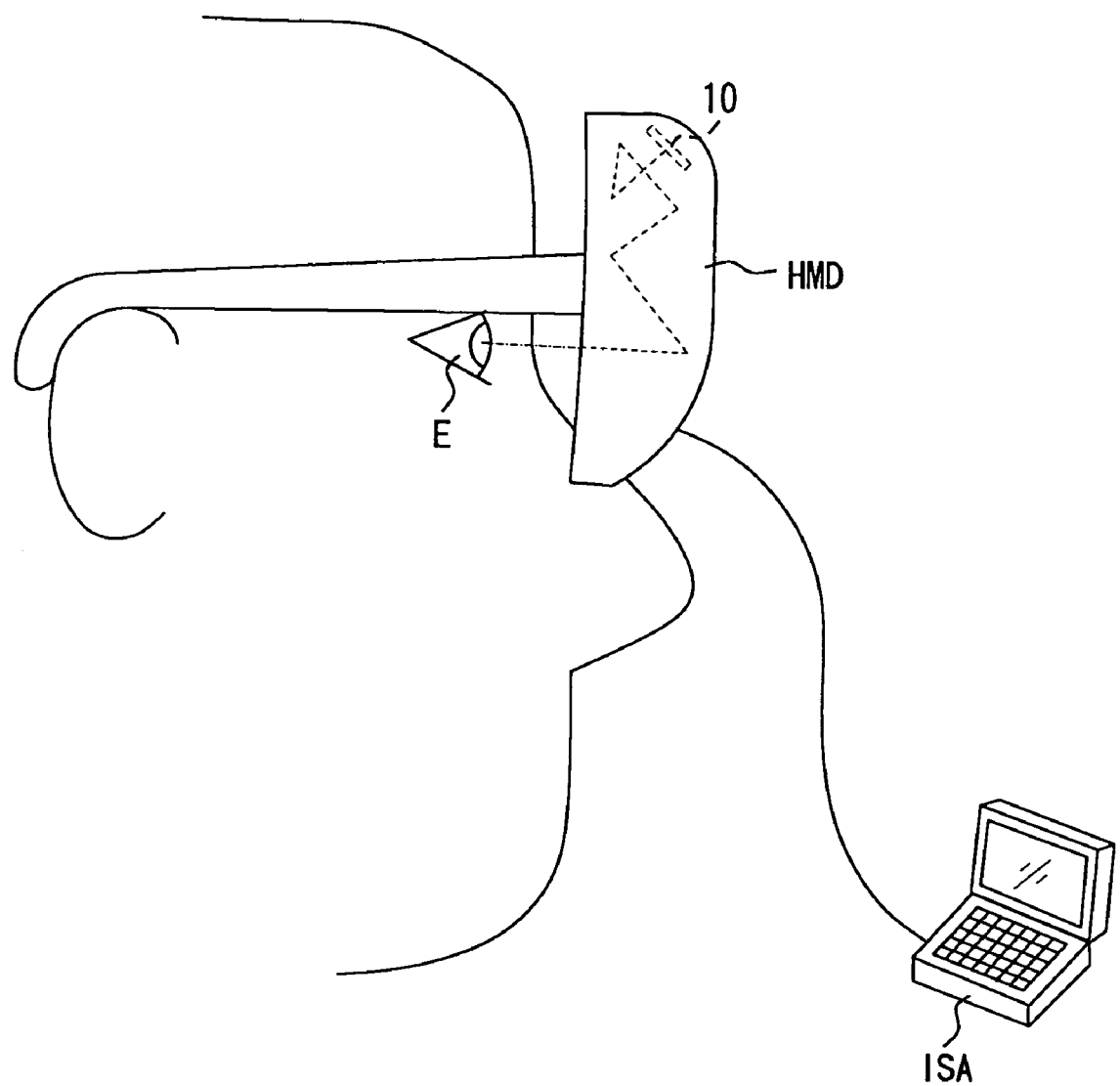
FIG. 4 is a schematic view of the head mounted display.

FIG. 1 is a section view of an optical system for image display according to Embodiment 1 of the present invention. FIG. 1 shows a YZ section of the optical system according to Embodiment 1 of the present invention. The optical system has a plane-symmetric shape only with respect to the paper plane of FIG. 1. The optical system of Embodiment 1 and other optical systems of Embodiments 2 and 3, described below, are used for a head mounted display HMD put on the head of an observer as shown in FIG. 4 to guide a displaying luminous flux from an image display device 10, later described, to an eye E of the observer. Connected to the head mounted display HMD is an image information supply apparatus ISA such as a personal computer, a DVD player, a VCR, and a television tuner. The image display device 10 can display an original image in accordance with image information supplied from the image information supply apparatus ISA to allow the observer to observe an enlarged image of the original image.

The optical system of Embodiment 1 guides the original image displayed on the image display device 10 to an exit pupil S1 of the optical system through the optical system which is a decentered optical system. In the following, a local generatrix section and a local directrix section are defined in association with the decentered optical system of Embodiment 1.

A ray emerged from the center of an effective display surface of the image display device 10 to the center of the exit pupil S1 is defined as a central field-angle principal ray or a central principal ray (hereinafter referred to as a central principal ray). On a point where the central principal ray hits each optical surface, a plane including the incident central principal ray and the emergent central principal ray is defined as the local generatrix section, while a plane including the hit point, perpendicular to the local generatrix section, and in parallel with an XZ plane in each surface vertex coordinate system is defined as the local directrix section. In addition, of the radius of curvature of each optical surface near the hit point of the central principal ray, the radius of curvature within the local generatrix section is defined as ry, while the radius of curvature within the local directrix section is defined as rx.

When refractive indices before and after a transmissive surface are represented by nd and nd', respectively, then fy given as follows is defined as a focal length on the local generatrix section:

$$fy=ry/(nd'-nd)$$

and fx given as follows is defined as a focal length on the local directrix section:

$$fx=rx/(nd'-nd)$$

A surface distance d between adjacent optical surfaces is defined as a distance between hit points of the central principal ray at the optical surfaces, that is, as a distance on the central principal ray (a value without conversion to equivalent air).

The optical system according to Embodiment 1 has an optical path along which the original image displayed on the image display device 10 is guided to the exit pupil S1 of the optical system. A relay optical system provided in the optical path forms an intermediate image 51 of the original image. In addition, an ocular optical system guides the intermediate image 51 to the exit pupil S1 corresponding to the position of the eye of the observer. The intermediate image formed in this manner allows the original image displayed on the image display device 10 to be enlarged at a higher magnification as compared with the case where no intermediate image is formed, thereby presenting an image to the observer at a wide angle of view.

The optical system shown in FIG. 1 has a first optical element 1 and a second optical element 2 in order from the side of the exit pupil S1 of the optical system to the side of the image display device 10.

In the optical system, the relay optical system which produces the intermediate image 51 of the original image displayed on the image display device 10 is formed of the second optical element 2 in a prism shape made of a transparent body and a portion of the first optical element 1 in a prism shape made of a transparent body different from that of the second optical element 2. The ocular optical system which presents the intermediate image 51 to the exit pupil S1 of the optical system is formed of another portion of the first optical element 1.

The first optical element 1 is a prism body made of a transparent medium with a refractive index of 1 or higher which has four optical surfaces S2 to S6 formed thereon. At least one of the optical surfaces is a curved surface decentered with respect to the displaying luminous flux from the image display device 10 (the central principal ray, in other words, the optical path of the luminous flux). The optical surface S2 and the optical surface S4 indicate the same continual surface which is used both as a transmissive surface (S4) and a reflective surface (S2).

The second optical element 2 is a prism body made of a transparent medium with a refractive index of 1 or higher which has four optical surfaces S7 to S10 formed thereon. At least one of the optical surfaces is a curved surface decentered with respect to the displaying luminous flux (the central principal ray). As apparent from optical data in Table 1 shown below, the optical elements 1 and 2 are made of materials different from each other in Embodiment 1 such that chromatic aberration particularly can be eliminated effectively.

As the image display device 10, a CRT (Cathode Ray Tube) of a self-emission type, a display device with electroluminescence, or a transmissive LCD (Liquid Crystal Display) is used in combination with an illumination light source, not shown.

The displaying luminous flux emerged from a display surface SI of the image display device 10 is incident in the second optical element 2 from the surface S10 which is a transmissive surface, subjected to internal total reflections by the surfaces S9 and S8 which are reflective surfaces, and then emerges out of the second optical element 2 from the surface S7 which is a transmissive surface. Then, the displaying luminous flux is incident into the first optical element 1 from the surface S6 which is a transmissive surface (an incident surface) and forms the intermediate image 51 before or after reflection by the surface S5 which is a reflective surface S5 (that is, in the vicinity of the reflective surface S5).

While the internal total reflection may be used at the reflective surfaces S8 and S9 forming part of the second optical element 2, the reflective surfaces S8 and S9 can have metal films or the like formed thereon as reflective films to eliminate loss of an amount of light and facilitate optical design.

The relay optical system which forms the intermediate image 51 of the original image displayed on the image display device 10 needs to have a predetermined positive optical power as a combined optical power of the relay optical system in order to condense the displaying luminous flux emerged from the image display device 10 as divergent light.

In Embodiment 1, since the intermediate image 51 is formed by condensing the luminous flux by the decentered optical system, it is difficult to converge the luminous flux emerged from a point on the image display device 10 to a point to form the intermediate image 51. Thus, the position of the intermediate image 51 shown in FIG. 1 is defined as a position where the outermost rays of the luminous flux emerged from a point on the image display device 10 is converged.

To reduce the size of the second optical element 2 forming part of the relay optical system to achieve reductions in size and weight of the entire optical system, increasing the positive optical power of each optical surface constituting the second optical element 2 is effective. Specifically, an increased positive optical power of each surface can reduce each focal length to reduce each interval between adjacent surfaces, thereby allowing an optical surface with a small area to provide a predetermined positive optical power for the displaying luminous flux while the diameter of the displaying luminous flux is maintained to be small. It is thus possible to reduce the area of each optical surface and the intervals among them, and even the size of the second optical element 2. As a result, the image display device 10 can be disposed in close proximity to the second optical element 2 to further reduce the size of the entire optical system.

The displaying luminous flux from the image display device 10 forms the intermediate image 51 in the first optical element 1, and then is incident on and reflected by the surface S4 which is a reflective surface in the ocular optical system while it is divergent. Next, the displaying luminous flux is reflected by the surface S3 which is a reflective surface, emerges out of the first optical element 1 from the surface S2 which is a transmissive surface (an emergent surface), and reaches the exit pupil S1.

While an internal total reflection may be used at the reflective surfaces S3 and S5 formed on the first optical element 1, the reflective surfaces S3 and S5 can have metal films or the like formed thereon as reflective films to eliminate loss of an amount of light and facilitate optical design. The reflective surface S4 may be formed of a half mirror. However, the surface S4 shares the surface with the transmissive surface S2, so that an internal total reflection is desirable in order to suppress loss of a light amount. A reflection with a reflective film may be provided for a portion of the reflective surface S4 which is not shared with the transmissive surface S2.

The ocular optical system which guides the intermediate image 51 formed in the first optical element 1 to the exit pupil S1 needs to have a function of condensing the displaying luminous flux divergent from the intermediate image 51 and guiding the condensed luminous flux to the exit pupil S1 as a generally collimated luminous flux or an appropriately condensed luminous flux such that the eye of the observer positioned at the exit pupil S1 can recognize the luminous flux as emitted from a predetermined distance. Thus, it is necessary to provide a predetermined positive optical power for the ocular optical system.

In the optical system including the relay optical system and the ocular optical system for the head mounted display formed as described above, to ensure a sufficient image magnification while the second optical element 2 is reduced in size, in the optical system according to Embodiment 1, a combined optical power provided by the transmissive surfaces S7 and S6 through which the displaying luminous flux passes at the time of emergence from the second optical element 2 and incidence on the first optical element 1 is a negative optical power.

As described above, increasing the optical power of each surface to reduce the focal length of the second optical element 2 is effective to reduce the size of the second optical element 2 forming part of the relay optical system. On the other hand, the ocular optical system needs to have a predetermined positive optical power. To provide a favorable optical system, it is necessary to consider balance of such a power arrangement in the relay optical system and the ocular optical system, and if the balance is not struck, simultaneous achievement of a sufficient image magnification and a reduction of the size of the second optical element 2 is difficult.

To address this, an appropriate negative optical power in combination is provided for the transmissive surface S7 which is the emergent surface of the second optical element 2 and the transmissive surface S6 which is the incident surface of the first optical element 1 in the relay optical system to strike a balance of the power arrangement between the relay optical system and the ocular optical system which has the appropriate positive optical power. Thus, the second optical element 2 can be reduced in size while a predetermined image magnification is maintained. In this case, a pupil image-forming surface 61 formed in the optical path is desirably formed in the second optical element 2.

Furthermore, the combined negative optical power is provided by the transmissive surfaces S7 and S6 to allow elimination of a chromatic aberration occurring due to a high positive optical power of the transmissive surface S10 which is essential in reducing the size of the second optical element 2.

In Embodiment 1, the high positive optical power of the transmissive surface S10 causes a chromatic aberration. However, the ocular optical system provides a high positive optical power for the displaying luminous flux mainly by the reflective surface, so that the chromatic aberration occurring in the relay optical system is difficult to eliminate. The transmissive surfaces having the negative optical power can be provided for the relay optical system to substantially eliminate color splitting found at the exit pupil S1.

Embodiment 1 shown in FIG. 1 illustrates an example where the transmissive surface S6 is formed to have a positive optical power, the transmissive surface S7 is formed to have a negative optical power, and the combined optical power of the transmissive surfaces S7 and S6 is the negative optical power. However, the present invention is not limited thereto, and it is possible that the transmissive surface S6 has a negative optical power and the transmissive surface S7 has a positive optical power or both of the surfaces S7 and S6 have negative optical powers as long as the transmissive surfaces S7 and S6 have an appropriate negative optical power in combination.

In Embodiment 1, the ocular optical system is formed by using part of the first optical element 1 in the prism shape. However, the present invention is not limited thereto, and the present invention is applicable to an optical system which has at least one transmissive surface having a negative optical power in a relay optical system with a positive optical power which includes a transmissive surface and a reflective surface.

The structures of the first and second optical elements 1 and 2 as the prism bodies shown in FIG. 1 are not limited to those shown in FIG. 1 or those represented by numerical values in Table 1 provided below. Each of them may be formed of five or more optical surfaces in order to dispose the image display device at an optimal position to provide a preferable image for an observer. In addition, the number of reflections in each prism is not limited to that in FIG. 1.

As described above, in the optical system of Embodiment 1 using prism bodies, an internal reflection in a prism is used to fold a long optical path to reduce the size of the entire optical system while a predetermined optical power is provided for the displaying luminous flux. Also, an intermediate image formed in the optical system allows a high image-forming magnification. In addition, the relay optical system for forming an intermediate image includes a transmissive surface having a negative optical power as one of optical surfaces forming a prism body, so that the prism body forming the relay optical system can be reduced in size and the magnification of the entire optical system can be increased. Furthermore, the transmissive surface having the negative optical power provided in the relay optical system enables appropriate correction of a chromatic aberration as the entire optical system.

Optical data of the optical system shown in FIG. 1 is given in Table 1. With the data in Table 1, when an image display device with an image size of approximately 9.6 mm×7.2 mm is used, the optical system shown in FIG. 1 can display an image with an exit pupil diameter of 12 mm and a horizontal angle of view of 50° at infinity in the Z axis direction.

Embodiment 2

Figure 2:
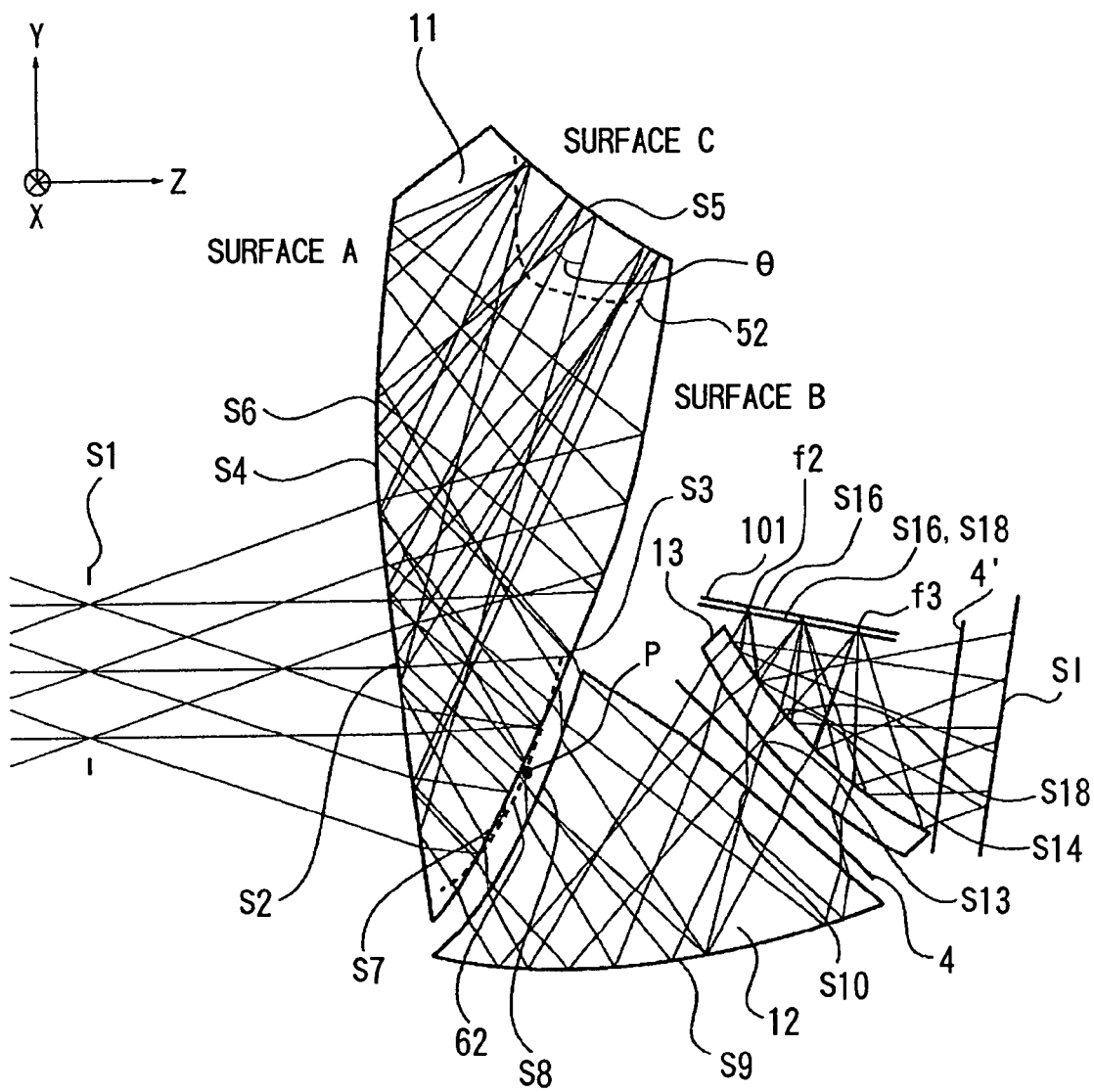
FIG. 2 is a section view of an optical system for a head mounted display according to Embodiment 2 of the present invention.

FIG. 2 is a section view of an optical system for a head mounted display according to Embodiment 2 of the present invention. FIG. 2 shows a YZ section of the optical system according to Embodiment 2. The optical system has a plane-symmetric shape only with respect to the paper plane of FIG. 2.

In the optical system according to Embodiment 2, an original image displayed on an image display device 101 is guided to an exit pupil S1 of the optical system through a decentered optical system, similarly to the optical system described in Embodiment 1. Thus, the same definitions as those in Embodiment 1 are used for a local generatrix section, a local directrix section and the like.

In the optical system according to Embodiment 2, similarly to the optical system described in Embodiment 1, a relay optical system in an optical path forms an intermediate image 52 of the original image displayed on the image display device 101 to enlarge the original image at a high image magnification to allow presentation of the image to an observer at a wide angle of view.

The intermediate image 52 formed in the optical system of Embodiment 2 is defined in the same manner as in Embodiment 1. When a ray passing from an outermost image point f3 away from the exit pupil S1 to the center of the exit pupil S1 is defined as an f3-central ray and a ray passing from an outermost image point f2 closer to the exit pupil S1 to the center of the exit pupil S1 is defined as an f2-central ray, in the outermost image portion on the local generatrix section on an effective display surface of the image display device 101, a pupil image-forming surface is defined as a surface which includes a point P at which the f3-central ray intersects the f2-central ray.

The optical system according to Embodiment 2 mainly differs from the optical system described in Embodiment 1 in that a reflective LCD or the like which is a reflective display device is used as the image display device 101 and the relay optical system shares some of optical surfaces with an ocular optical system. The use of the reflective type LCD as the image display device 101 is desirable in reducing the size of the display surface to display an image at high density. In the following, the optical system according to Embodiment 2 is described mainly for the differences from the optical system described in Embodiment 1.

The optical system shown in FIG. 2 has a first optical element 11, a second optical element 12, and a third optical element 13, in order from the side of the exit pupil S1 of the optical system to the side of the image display device 101.

In the optical system, the relay optical system which produces the intermediate image 52 of the original image displayed on the image display device 101 is formed of the second optical element 12 in a prism shape made of a transparent body and a portion of the first optical element 11 in a prism shape made of a transparent body different from that of the second optical element 12. The ocular optical system which presents the intermediate image 52 to the exit pupil S1 of the optical system is formed in the first optical element 11.

The first optical element 11 is a prism body made of a transparent medium with a refractive index of 1 or higher which has five optical surfaces S2 to S7 formed thereon. At least one of the optical surfaces is a curved surface decentered with respect to a ray (a central principal ray). The optical surfaces S2, S4, and S6 are portions of a continual surface A which is used both as reflective surfaces (S4 and S6) and a transmissive surface (S2). In addition, the optical surfaces S3 and S7 are portions of a continual surface B which is used both as a transmissive surface (S7) and a reflective surface (S3). From the viewpoint of the usability of light, it is desirable that the surface B is transparent and the reflective surface S3 performs an internal total reflection, but it may be formed of a half mirror when the use of a total reflection is difficult. In each of the surface A and the surface B, the same area is used as different optical surfaces to reduce the volume of the entire prism body to achieve reductions in the size and weight of the entire optical system.

The second optical element 12 forms part of the relay optical system and is a prism body made of a transparent medium with a refractive index of 1 or higher which has three optical surfaces S8 to S10 formed thereon. At least one of the optical surfaces is a curved surface decentered with respect to the ray.

The third optical element 13 is used as an illumination optical system which guides illumination light from a plane illumination light source SI to the image display device 101 and as a relay optical system which guides a displaying luminous flux from the image display device 101. The third optical element 13 has cylindrical transmissive surfaces S13 and S14 on both sides. A reflective surface S18 is identical to the transmissive surface S14 and is desirably formed of a half mirror for use as the transmissive surface and the reflective surface at the same time. The reflective surface S18 of the third optical element 13 has a power only in the local generatrix section to reduce the size of the plane illumination light source SI in a direction perpendicular to the local generatrix section. While both surfaces of the third optical element 13 have a cylindrical shape in Embodiment 2, they are not necessarily formed in the cylindrical shape and an arbitrary surface shape can be used in consideration of the arrangement of respective elements and the like.

The illumination luminous flux emitted from the plane illumination light source SI passes through a polarizing plate (a polarizer) 4', is changed to linearly polarized light, and reflected by the reflective surface S18 of the third optical element 13 toward the reflective LCD 101. The light incident obliquely on and reflected by the reflective LCD 101 becomes the displaying luminous flux. The displaying luminous flux is then transmitted through the transmissive surfaces S14 and S13 of the third optical element 13 and next transmitted through a polarizing plate (an analyzer) 4 toward the second optical element 12. A surface S15 (identical to a surface S17) and a surface S16 are surfaces on a cover glass of the reflective LCD 101.

In the aforementioned optical path, it is desirable to dispose the polarizing plate 4 and the polarizing plate 4' such that the polarizing directions thereof form a right angle. Such an arrangement allows only rays, of which the polarizing direction is rotated 90 degrees by the image display device 101, to pass through the polarizing plate 4, and shields rays not rotated by the image display device 101 and rays passing through the reflective surface S18. Thus, ghost light other than the displaying luminous flux can be prevented from being incident on the second optical element 12.

In Embodiment 2, the third optical element 13 is made of a glass member with low birefringence. When the reflective LCD is used as the image display device 101, the polarizing plate (the polarizer) 4' is disposed in the illumination optical system and the other polarizing plate (the analyzer) 4 is disposed in the display optical system in many cases. The reflective liquid crystal and the polarizing plate 4 in the display optical system are optically in a parallel Nicol relationship, so that a material with high birefringence disposed between them is not preferable since photoelasticity of the material is observed as a ghost. In some liquid crystals, a crossed Nicol relationship is used for display.

In Embodiment 2, the third optical element 13 is disposed between the reflective image display device 101 and the polarizing plate 4. However, the third optical element 13 is made of the glass material with low birefringence, so that a favorable image can be presented to an observer without visually recognizing photoelasticity of the material by the observer.

The displaying luminous flux passing through the polarizing plate (the analyzer) 4 and incident into the second optical element 12 from the surface S10 which is a transmissive surface is internally reflected by the surface S9 which is a reflective surface and emerges out of the second optical element 12 from the surface S8 which is a transmissive surface. Then, the displaying luminous flux is incident into the first optical element 11 from the transmissive surface S7, internally reflected by the reflective surface S6, and forms the intermediate image 52 before or after reflection by the surface S5 which is a reflective surface (that is, in the vicinity of the reflective surface S5).

While an internal total reflection may be used at the reflective surface S9 forming part of the second optical element 12, the reflective surface S9 can have a metal film or the like formed thereon as a reflective film to eliminate loss of an amount of light and facilitate optical design.

The relay optical system which forms the intermediate image 52 of the original image displayed on the image display device 101 needs to have a predetermined positive optical power as a combined optical power of the entire relay optical system in order to condense the displaying luminous flux emerged as divergent light from the image display device 101. In addition, to reduce the size of the second optical element 12 forming part of the relay optical system to achieve reductions in size and weight of the entire optical system, increasing the positive optical power of each optical surface forming the second optical element 12 is effective as described above.

The displaying luminous flux emerged from the image display device 101 and formed into the intermediate image 52 in the first optical element 11 is then reflected by the reflective surface S4 and the reflective surface S3 in this order while it is divergent in the ocular optical system, emerges out of the first optical element 11 from the transmissive surface S2, and then reaches the exit pupil S1.

While an internal total reflection may be used at the reflective surface S5 formed on the first optical element 11, the reflective surface S5 can have a metal film or the like formed thereon as a reflective film to eliminate loss of an amount of light and facilitate optical design. The reflective surface S3 may be formed of a half mirror for convenience in optical design since it is also used as the transmissive surface S7, but an internal total reflection can be utilized, or it is possible that a reflective film is formed only in the portion of the reflective surface S3 by avoiding overlap between the reflective surface S3 and the transmissive surface S7. The reflective surface S4 may be formed by a half mirror, but it is desirable to cause an internal total reflection in order to suppress loss of a light amount since the surface S4 shares a portion with the transmissive surface S2. Reflection with a reflective film may be provided for a portion of the reflective surface S4 which is not used by the transmissive surface S2.

The ocular optical system which guides the intermediate image 52 formed in the first optical element 11 to the exit pupil S1 needs to have a function of condensing the displaying luminous flux divergent from the intermediate image 52 and guiding the condensed luminous flux to the exit pupil S1 as a generally collimated luminous flux or an appropriately condensed luminous flux such that an eye of the observer positioned at the exit pupil S1 can recognize the luminous flux as emitted from a predetermined distance.

In the first optical element 11, the displaying luminous flux forms a to-and-fro optical path in which the luminous flux travels to respective surfaces in the order of the surface B, the surface A, a surface C, the surface A, and the surface B such that the luminous flux is guided to the forward path (the surface B, the surface A, and then the surface C) and then to the return path in opposition (the surface C, the surface A, and then the surface B) with the reflection by the surface C (the reflective surface S5) as the returning point. The surface C (the reflective surface S5) at the boundary between the forward path and the return path serves as a returning reflective surface. Specifically, the returning optical path is formed such that, before and after the reflection by the surface C, the luminous flux is reflected and travels in the return path toward the substantially opposite side to the reflecting side in the forward path (previous reflection) with respect to the normal to the surface A at the hit point of the central principal ray of the displaying luminous flux. In this manner, the optical path is folded by the plurality of decentered reflective surfaces A, B, and C to substantially overlap the forward path and the return path, thereby allowing a long optical path to be contained in the small first optical element 11. This can reduce the size of the entire display optical system. In addition, since an increased number of reflections can be used, the optical action provided by one reflection can be reduced to suppress occurrence of various aberrations.

When attention is focused on the reflection by the reflective surface before and after the returning reflection, for example the surface A, the outer product formed by a vector indicating the incident direction of the central principal ray on the surface S6 and a vector indicating the reflected direction of the central principal ray therefrom in the forward path has a generally opposite direction to the outer product formed by a vector indicating the incident direction of the central principal ray on the reflective surface S4 and a vector indicating the reflected direction of the central principal ray therefrom in the return path. The reflection with the returning reflective surface C thus characterized can be used to contain a long optical path in the small space while distortion is suppressed, as compared with typical zigzag reflections between two surfaces generally facing each other.

While Embodiment 2 illustrates the reflection made twice at substantially the same surface on the surface A, the present invention is not limited thereto, and three or more reflections may be made on a predetermined reflective surface by a plurality of returning reflections to use the optical power of the predetermined surface. In addition, it is possible to provide a plurality of reflective surfaces such that each of them causes a plurality of reflections.

While FIG. 2 illustrates the case where the incident ray and the reflected ray on and from the returning reflective surface are contained in the paper plane of FIG. 2, such an arrangement is not necessarily set. Specifically, it may be possible that the returning reflective surface provides the ray reflected thereon with a component perpendicular to the paper plane of FIG. 2. In this case, for example when attention is focused on the reflection by the reflective surface S4 and the reflective surface S6, the directions of the outer products each formed by the vector indicating the incident direction and the vector indicating the reflective direction on the respective surfaces in the forward and return paths form an obtuse angle. The structure of the optical path is also characterized in that the inner product formed by those outer products is negative. In addition to the returning reflective surface, another reflective surface may provide the ray reflected thereon with a component perpendicular to the paper plane of FIG. 2. With such setting, each reflective surface also has a decentration perpendicular to the paper plane with respect to the ray to improve the flexibility in optical design.

In addition, the respective reflective surfaces forming the folded optical path are formed as decentered reflective surfaces to allow the optical path to be folded in a thin optical element, thereby setting a long optical path in a small and thin optical system.

Since the surface C (the reflective surface S5) is arranged at an angle to reflect the central principal ray substantially perpendicularly to form the aforementioned forward and return paths, the surface C is not necessarily decentered with respect to the central principal ray. The substantially perpendicular reflection means that the incident ray and the emerging ray on and from the surface C forms an angle θ (in an absolute value) smaller than 60°.

Specifically, when the ray incident on the surface C (the reflective surface S5) which is the returning reflective surface is reflected thereon, the ray is incident and reflected to form the predetermined angle θ before and after the reflection by the returning reflective surface and the angle θ preferably satisfies:

$$|\theta|<60° \quad (1)$$

If the conditional expression is not satisfied, the optical path after the returning reflection (the return path) does not follow back along the forward path to cause difficulty in optimally guiding the ray to the pupil with a small prism body.

In addition, the following conditional expression (2) may be satisfied:

$$|\theta|<30° \quad (2)$$

If the conditional expression (2) is not satisfied, the ray can return after the reflection, but the forward path does not overlap the return path and the size of the optical element is increased in order to optimally guide the ray to the pupil, making it difficult to reduce the size of the entire display apparatus.

When the following conditional expression (3) is satisfied, a further reduction in size can be achieved:

$$|\theta|<20° \quad (3)$$

The conditions of the angle of the incidence and emergence of the ray on and from the returning reflective surface also apply to the case where a returning reflective surface is provided for the second optical element 12 or another optical system.

In the relay optical system and the ocular optical system for the head mounted display formed as described above, increasing positive optical powers of the transmissive surface S10 and the reflective surface S9 forming part of the second optical element 12 is effective as described above to reduce the size of the second optical element 12 forming part of the relay optical system.

Since part of the relay optical system is also used as the ocular optical system having a high positive optical power in order to reduce the size of the entire optical system in Embodiment 2, the relay optical system has a high positive optical power as a result. On the other hand, when the relay optical system has a high positive optical power, its focal length is reduced to cause difficulty in inserting the third optical element 13 for separating the illumination light from the displaying light required when the reflective display device is used.

To solve the problem, in the optical system according to Embodiment 2, a negative optical power is set as a combined optical power of the transmissive surface S8 of the second optical element 12 from which the displaying luminous flux emerges and the transmissive surface S7 of the first optical element 11 on which the displaying luminous flux is incident. This allows a reduced size of the second optical elements 12 and an increased focal length of the relay optical system at the same time, so that the third optical element 13 can be inserted between the second optical element 12 and the image display device 101. In addition, as described in Embodiment 1, the increased focal length of the relay optical system can ensure a sufficient image magnification and an adequate eye relief while a high magnification of the entire optical system is achieved.

In Embodiment 2, however, the transmissive surface S8 having the negative optical power exists near the pupil image-forming surface 62. As the combined negative power of the transmissive surfaces S8 and S7 is higher, the optical path length from the pupil image-forming surface 62 to the image display device 101 is greater to result in an increased size of the entire optical system. Thus, when the negative optical power is present near the pupil image-forming surface 62, each combined local focal length desirably satisfies the following conditional expression (4):

$$|FyR/FyT|<0.060$$

$$|FxR/FxT|<0.060 \quad (4)$$

Each term in the aforementioned expressions is the same as that defined in Numerical Examples shown below.

When the conditional expression (4) is satisfied, the focal length of the relay optical system can be increased without increasing the size of the entire optical system, and the third optical element 13 required for using the reflective image display device can be inserted in the optical path.

Providing the negative power for the transmissive surface S8 can eliminate chromatic aberration produced by the high positive optical power of the transmissive surface S10 which is essential in reducing the size of the second optical element 12.

While the ocular optical system is formed by using part of the first optical element 11 in the prism shape in Embodiment 2, the present invention is not limited thereto. The present invention is applicable to an optical system which has at least one transmissive surface having a negative optical power in a relay optical system with a positive optical power which includes a transmissive surface and a reflective surface.

The structures of the first and second optical elements 11 and 12 in the prism body shown in FIG. 2 are not limited to those shown in FIG. 2 or those represented by numerical values in Table 1 provided below. Each of them may be formed of five or more optical surfaces in order to dispose the image display device at an optimal position to provide a preferable image for an observer. In addition, the number of reflections in each prism is not limited to that in FIG. 2 or the like.

As described above, in the optical system of Embodiment 2 using prism bodies, an internal reflection in the prism body is used to fold a long optical path to reduce the size of the entire optical system while a predetermined optical power is provided for the displaying luminous flux. Also, forming an intermediate image allows a high image-forming magnification. In addition, the relay optical system for forming the intermediate image includes a transmissive surface having a negative optical power as one of the optical surfaces forming the prism body, so that the prism body forming the relay optical system can be reduced in size and the focal length of the relay optical system can be increased to allow use of the reflective image display device. Moreover, the image magnification of the entire optical system can be increased while a predetermined eye relief to an observer is maintained, and appropriate correction of a chromatic aberration is achieved for the entire optical system.

Optical data of the optical system of Embodiment 2 shown in FIG. 2 is given in Table 2. With the data in Table 2, when an image display device with an image size of approximately 9.6 mm×7.2 mm is used, the optical system shown in FIG. 2 can display an image with an exit pupil diameter of 12 mm and a horizontal angle of view of 50° at infinity in the Z axis direction.

Embodiment 3

Figure 3:
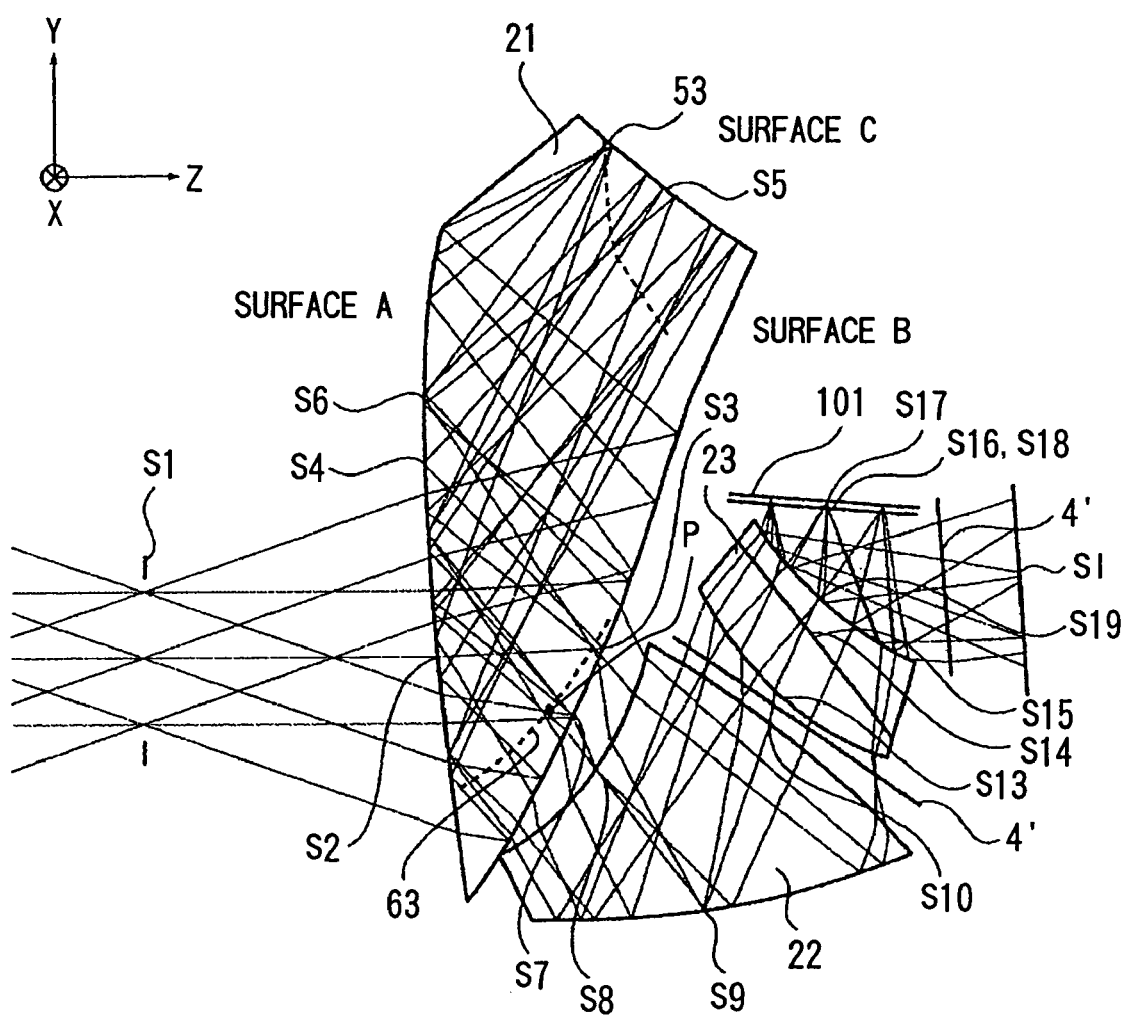
FIG. 3 is a section view of an optical system for a head mounted display according to Embodiment 3 of the present invention.

FIG. 3 is a section view of an optical system for a head mounted display according to Embodiment 3 of the present invention. FIG. 3 shows a YZ section of the optical system according to Embodiment 3. The optical system has a plane-symmetric shape only with respect to the paper plane of FIG. 3.

While the optical system according to Embodiment 3 has an optical path generally similar to that in the optical system described in Embodiment 2, it has an optical power arrangement in optical surfaces different from that of Embodiment 2. Embodiment 3 also differs from Embodiment 2 in that a third optical element 23 for use in separating illumination light from displaying light is formed by cementing different materials. Thus, the same definitions as those in Embodiment 2 are used for a local generatrix section, a local directrix section and the like.

In the following, the optical system according to Embodiment 3 is described mainly for the differences from the optical system described in Embodiment 2.

The optical system shown in FIG. 3 has a first optical element 21, a second optical element 22, and a third optical element 23, in order from the side of an exit pupil S1 of the optical system to the side of an image display device 101. The first optical element 21 and the second optical element 22 are optical elements in a prism shape made of transparent bodies having the structures similar to those of the first optical element 11 and the second optical element 12 in Embodiment 2, respectively, and have different curved surfaces.

The third optical element 23 is shared between an illumination optical system which guides the illumination light from a plane illumination light source SI to the image display device 101 and a relay optical system which guides the displaying luminous flux from the image display device 101. The third optical element 23 is a cemented lens which has a cylindrical transmissive surface S13, a transmissive surface S14 (a cemented surface) and a transmissive surface S15. A reflective surface S19 is identical to the transmissive surface S15 and the surface is desirably formed of a half mirror for use as the transmissive surface and the reflective surface at the same time.

The optical system according to Embodiment 3 has characteristics as described below provided by optimizing the optical power of the third optical element 23, as compared with the optical system shown in Embodiment 2.

In Embodiment 3, while transmissive surfaces S10 and S9 have high positive optical powers to reduce the size of the second optical element 22, a transmissive surface S8 is provided with a negative optical power to prevent a reduced focal length of the relay optical system, similarly to the optical system of Embodiment 2 shown in FIG. 2.

In the structure shown in FIG. 2, since the transmissive surface S8 having the negative optical power is positioned near the pupil image-forming surface 63 formed in the optical path, the optical path length from the pupil image-forming surface 63 to the image display device 101 which is the reflective LCD is longer as the negative optical power is higher, resulting in an increased size of the entire optical system.

In contrast, in the optical system according to Embodiment 3, a pupil image-forming surface 63 is formed in the second optical element 21 after the transmissive surface S8 mainly by optimizing the optical power of the third optical element 23. This allows the pupil image-forming surface 63 to be disposed away from the negative optical power. As a result, a long optical path length from the image display device 101 to the pupil image-forming surface 63 can be ensured in the opposite side to the image display device 101 to increase the negative power without increasing the size of the entire optical system.

In other words, as seen in Numerical Examples shown later, local focal lengths on the generatrix and the directrix of an air lens formed by the transmissive surfaces S7 and S8 can be reduced as compared with Embodiment 2 to provide an increased negative optical power without increasing the size of the entire optical system.

When the negative optical power is present between the image display device 101 and the pupil image-forming surface 63 in this manner, the following conditional expression (5) is desirably satisfied:

$$|FyR/FyT| \geqq 0.060$$

$$|FxR/FxT| \geqq 0.060 \qquad (5)$$

The optical path length from the pupil image-forming surface 63 to the image display device 101 can be sufficiently ensured by satisfying the conditional expression (5) in the aforementioned structure to sufficiently ensure. The negative optical power placed between the image display device 101 and the pupil image-forming surface 63 in the relay optical system can increase the interval between the second optical element 22 and the image display device 101 without increasing the size of the optical system even when the negative optical power is increased, thereby making it possible to achieve excellent optical performance.

The third optical element 23 is formed as a cemented lens formed by using glass materials as different media to allow favorable correction of a chromatic aberration. In addition, the transmissive surfaces S13 to S15 can be decentered to appropriately correct a decentration aberration or the like produced in the first and second optical elements 21 and 22, so that a significantly satisfactory image can be presented to an observer.

Optical data of the optical system shown in FIG. 3 is given in Table 3. With the data in Table 3, when an image display device with an image size of approximately 9.6 mm×7.2 mm is used, the optical system shown in FIG. 3 can display an image with an exit pupil diameter of 12 mm and a horizontal angle of view of 50° at infinity in the Z axis direction.

NUMERICAL EXAMPLES

Tables 1 to 3 provide the optical data of the optical systems according to Embodiments 1 to 3 shown in FIGS. 1 to 3, respectively. In Tables 1 to 3, "SURF" fields represent surface numbers (i, i+1, . . . ) of the respective optical surfaces forming the optical systems shown in FIGS. 1 to 3. "X", "Y", and "Z" represent the positions of a surface vertexes (x, y, z) of each surface in a coordinate system which includes the center of the first surface S1 (the surface of the exit pupil) set as its origin (0, 0, 0) as well as the Y axis and the Z axis shown in FIGS. 1 to 3 and the X axis perpendicular to each paper plane of FIGS. 1 to 3. "A" represents a rotation angle (in degrees) about the X axis when a counterclockwise direction in FIGS. 1 to 3 is defined as a positive direction. "TYP" fields represent types of a surface shape, and specifically, "SPH" indicates a spherical surface, "FFS" a rotationally asymmetric surface, and "YTO" a cylindrical lens surface having a refractive power only on the generatrix section.

Each of rotationally asymmetric surfaces used in Embodiment 1 is realized in accordance with an expression of "FFS-no.1", shown later. Each of rotationally asymmetric surfaces used in Embodiments 2 and 3 is realized in accordance with an expression of "FFS-no.2", shown later. For the cylindrical lens surfaces (YTO), the generatrix section is represented by an expression of an aspheric surface, shown later, and the directrix section is a plane (rx=∞).

"R" fields represent the radius of curvature, and for the cylindrical lens surfaces, the radius of curvature ry of the generatrix section is given. For the rotationally asymmetric surfaces (FFS), the coefficient of each term (c**) in each expression representing the shape is specified in a lower portion of each of Tables 1 to 3. Any coefficient with no specification of the numerical value is equal to zero.

Nd and vd represent the refractive index and the Abbe number of a medium between the i-th surface and the (i+1)-th surface on the optical path for the d line. A change in the sign of the refractive index Nd indicates that the corresponding surface is a reflective surface. When the medium is an air layer, only the refractive index Nd is shown as 1.0 and the Abbe number vd is omitted.

In Table 1, "Fyt" represents the combined local focal lengths on the generatrix section of the transmissive surface S7 from which the luminous flux emerges of the second optical element 2 and the transmissive surface S6 on which the luminous flux is incident of the first optical element 1, and "FxT" represents the combined local focal lengths on the directrix section of them.

In Tables 2 to 3, the absolute values of FyR/FyT and FxR/FxT are specified, where FyR and FxR represent the local focal lengths of the relay optical system on the generatrix section and directrix section, respectively.

FFS-no.1:

$$z = c_2 x + c_3 y + c_4 x^2 + c_5 xy + c_6 y^2 + c_7 x^3 + c_8 x^2 y + c_9 x y^2 + c_{10} y^3 + c_{11} x^4 + c_{12} x^3 y + c_{13} x^2 y^2 + c_{14} x y^3 + c_{15} y^4 \ldots$$

FFS-no.2:

$$z = (1/R)*(x^2+y^2)/\left[1+\{1-(1+k)*(1/R)^2*(x^2+y^2)\}^{(1/2)}\right] +$$
$$c2 + c4*y + c5*(x^2 - y^2) + c6*(-1 + 2*x^2 + 2*y^2) + c10*$$
$$(-2*y + 3*x^2*y + 3*y^3) + c11*(3*x^2*y - y^3) + c12*$$
$$(x^4 - 6*x^2*y^2 + y^4) + c13*(-3*x^2 + 4*x^4 + 3*y^2 - 4*y^4) +$$
$$c14*(1 - 6*x^2 + 6*x^4 - 6*y^2 + 12*x^2*y^2 + 6*y^4) +$$
$$c20*(3*y - 12*x^2*y + 10*x^4*y - 12*y^3 + 20*x^2*y^3 + 10*y^5) +$$
$$c21*(-12*x^2*y + 15*x^4*y + 4*y^3 + 10*x^2*y^3 - 5*y^5) +$$
$$c22*(5*x^4*y - 10*x^2*y^3 + y^5) +$$
$$c23*(x^6 - 15*x^4*y^2 + 15*x^2*y^4 - y^6) +$$
$$c24*(-5*x^4 + 6*x^6 + 30*x^2*y^2 - 30*x^4*y^2 -$$
$$5*y^4 - 30*x^2*y^4 + 6*y^6) + c25*(6*x^2 - 20*x^4 + 15*x^6 -$$
$$6*y^2 + 15*x^4*y^2 + 20*y^4 - 15*x^2*y^4 - 15*y^6) + c26*$$
$$(-1 + 12*x^2 - 30*x^4 + 20*x^6 + 12*y^2 - 60*x^2*y^2 +$$
$$60*x^4*y^2 - 30*y^4 + 60*x^2*y^4 + 20*y^6) + \ldots$$

YTO:

$$z = (y^2/ry)/\{1sqrt(1-(1+k)y^2/ry^2)\} + by^4 + cy^6 + dy^8 + ey^{10}$$

TABLE 1

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | 8.300 | 27.930 | 0.840 | ∞ | FFS1 | 1.5274 | 56.2 |
| 3 | 0.000 | 0.000 | 34.580 | −25.650 | ∞ | FFS2 | −1.5274 | 56.2 |
| 4 | 0.000 | 8.300 | 27.930 | 0.840 | ∞ | FFS1 | 1.5274 | 56.2 |
| 5 | 0.000 | 23.870 | 39.680 | −0.020 | ∞ | FFS3 | −1.5274 | 56.2 |
| 6 | 0.000 | 35.310 | 31.050 | −48.970 | ∞ | FFS4 | −1.0000 | |
| 7 | 0.000 | 36.726 | 28.832 | −48.960 | 8.0000 | FFS5 | −1.4942 | 57.6 |
| 8 | 0.000 | 43.960 | 23.401 | −73.090 | ∞ | FFS6 | 1.4942 | 57.6 |
| 9 | 0.000 | 36.134 | 22.980 | −114.090 | ∞ | FFS7 | −1.4942 | 57.6 |
| 10 | 0.000 | 43.799 | 28.487 | −125.130 | ∞ | FFS8 | −1.0000 | |
| 11 | 0.000 | 47.898 | 26.775 | −125.130 | ∞ | SPH | −1.0000 | |

| | | | |
|---|---|---|---|
| FFS1 | c4: −1.0638e−002 | c6: −6.9011e−004 | c8: −1.4418e−004 |
| | c10: 1.5504e−005 | | |
| FFS2 | c4: −1.4149e−002 | c6: −8.1826e−003 | c8: 1.5320e−005 |
| | c10: 1.8228e−005 | | |

TABLE 1-continued

| | | | |
|---|---|---|---|
| FFS3 | c4: −3.6438e−003 | c6: −3.0000e−003 | c8: 2.3360e−004 |
| | c10: −1.4190e−004 | | |
| FFS4 | c4: 1.9435e−002 | c6: 5.4140e−002 | c8: −2.9190e−003 |
| | c10: 1.3755e−004 | | |
| FFS5 | c4: 5.0000e−002 | c6: 2.4840e−002 | c8: −1.0601e−002 |
| | c10: 2.7253e−003 | | |
| FFS6 | c4: 9.7079e−003 | c6: 1.3042e−002 | c8: −5.1343e−004 |
| | c10: 3.7383e−004 | | |
| FFS7 | c4: −1.7271e−002 | c6: −1.5657e−002 | c8: −2.0576e−004 |
| | c10: 2.7989e−004 | | |
| FFS8 | c4: 1.1330e−001 | c6: 4.0208e−002 | c8: −1.4570e−002 |
| | c10: 3.3936e−003 | | |
| FyT | 46.779 | | |
| FxT | 13.244 | | |

TABLE 2

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.462 | 19.915 | 6.671 | −943.8251 | FFS1 | 1.5300 | 55.8 |
| 3 | 0.000 | 0.845 | 31.507 | −22.816 | −85.2655 | FFS2 | −1.5300 | 55.8 |
| 4 | 0.000 | −0.462 | 19.915 | 6.671 | −943.8251 | FFS1 | 1.5300 | 55.8 |
| 5 | 0.000 | 23.494 | 43.154 | 53.275 | −73.3871 | FFS3 | −1.5300 | 55.8 |
| 6 | 0.000 | −0.462 | 19.915 | 6.671 | −943.8251 | FFS1 | 1.5300 | 55.8 |
| 7 | 0.000 | 0.845 | 31.507 | −22.816 | −85.2655 | FFS2 | 1.0000 | |
| 8 | 0.000 | −9.028 | 28.985 | −24.536 | 36.6752 | FFS4 | 1.5300 | 55.8 |
| 9 | 0.000 | −17.842 | 47.212 | −73.198 | −45.6252 | FFS5 | −1.5300 | 55.8 |
| 10 | 0.000 | −1.191 | 26.774 | −87.637 | 27.1391 | FFS6 | −1.0000 | |
| 11 | 0.000 | 11.424 | 26.253 | −136.460 | ∞ | SPH | −1.4900 | 40.0 |
| 12 | 0.000 | 11.562 | 26.398 | −136.460 | ∞ | SPH | −1.0000 | |
| 13 | 0.000 | 4.084 | 38.388 | −158.345 | −37.5262 | CYL | −1.8470 | 23.8 |
| 14 | 0.000 | 3.187 | 41.031 | −158.835 | −26.5641 | CYL | −1.0000 | |
| 15 | 0.000 | 3.442 | 41.689 | −101.574 | ∞ | SPH | −1.5200 | 55.0 |
| 16 | 0.000 | 3.803 | 42.622 | −101.574 | ∞ | SPH | 1.5200 | 55.0 |
| 17 | 0.000 | 3.442 | 41.689 | −101.574 | ∞ | SPH | 1.0000 | |
| 18 | 0.000 | 3.187 | 41.031 | −158.835 | −26.5641 | CYL | −1.0000 | |
| 19 | 0.000 | −16.727 | 54.103 | 171.165 | ∞ | SPH | −1.4900 | 40.0 |
| 20 | 0.000 | −16.758 | 54.301 | 171.165 | ∞ | SPH | −1.0000 | |
| 21 | 0.000 | −17.219 | 57.265 | 171.165 | 0.0000 | SPH | −1.0000 | |

FFS1 k: 6.3414e+002   c5: 1.2882e−003   c6: 2.1845e−003   c10: 1.3170e−005
c11: 1.9444e−006   c12: −3.5307e−007   c13: −7.9025e−007   c14: −4.5489e−007
c20: −6.6952e−010   c21: −8.6083e−009   c22: 1.0358e−009   c23: 2.4286e−010
c24: 1.5617e−010   c25: 8.3793e−011   c26: −6.9583e−012

FFS2 k: −1.0488e+000   c5: −1.2235e−003   c6: −3.0472e−005   c10: −2.2657e−005
c11: −3.2735e−005   c12: 3.5179e−007   c13: −1.1373e−007   c14: 7.0545e−008
c20: 2.9697e−009   c21: 2.7843e−009   c22: −3.2822e−009   c23: 1.5411e−010
c24: −8.7548e−011   c25: −1.7682e−011   c26: −1.0112e−010

FFS3 k: −1.7224e+002   c5: 3.8724e−003   c6: −8.6666e−004   c10: 9.0490e−005
c11: −7.4830e−005   c12: 3.0116e−006   c13: 1.0651e−006   c14: 3.4010e−007
c20: −5.3121e−008   c21: −1.6343e−007   c22: −6.1084e−007   c23: −1.5071e−008
c24: 1.6815e−010   c25: 1.0738e−009   c26: 8.8848e−010

FFS4 k: 1.3594e+000   c5: 1.6071e−005   c6: −1.0296e−002   c10: 3.6777e−005
c11: 1.5665e−004   c12: −2.1782e−006   c13: 2.5781e−007   c14: −7.4896e−006
c20: 2.9697e−009   c21: 2.7843e−009   c22: −3.2822e−009   c23: 1.5411e−010
c24: −8.7548e−011   c25: −1.7682e−011   c26: −1.0112e−010

FFS5 k: −3.5634e+000   c5: −2.2590e−003   c6: −4.1697e−004   c10: −1.4628e−005
c11: −4.1832e−006   c12: −7.8518e−007   c13: −2.3815e−007   c14: −4.7472e−007
c20: 1.9078e−008   c21: 3.1283e−008   c22: −1.6825e−008   c23: 9.0028e−011
c24: −2.3335e−010   c25: 2.8609e−010   c26: 2.2637e−010

FFS6 k: −8.5117e−002   c5: −5.5747e−003   c6: 1.9185e−003   c10: 1.1583e−005
c11: −1.9770e−004   c12: 6.8468e−006   c13: 1.5602e−007   c14: −1.0805e−006
c20: −8.8867e−009   c21: 5.0921e−008   c22: 8.8378e−008   c23: 2.5972e−009

TABLE 2-continued

| | | | |
|---|---|---|---|
| c24: −1.3442e−009 | c25: 3.6155e−010 | c26: −3.8958e−010 | |
| FyT: −283.110 | FxT: −1357.706 | FyR: 11.818 | FxR: 27.312 |
| \|FyR/FyT\| = 0.042 | | \|FxR/FxT\| = 0.020 | |

TABLE 3

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | |
| 2 | 0.000 | 4.116 | 19.316 | 4.945 | −783.6690 | FFS1 | 1.5300 | 55.8 |
| 3 | 0.000 | 1.869 | 31.270 | −21.667 | −86.9324 | FFS2 | −1.5300 | 55.8 |
| 4 | 0.000 | 4.116 | 19.316 | 4.945 | −783.6690 | FFS1 | 1.5300 | 55.8 |
| 5 | 0.000 | 25.474 | 43.581 | 51.613 | −69.2328 | FFS3 | −1.5300 | 55.8 |
| 6 | 0.000 | 4.116 | 19.316 | 4.945 | −783.6690 | FFS1 | 1.5300 | 55.8 |
| 7 | 0.000 | 1.869 | 31.270 | −21.667 | −86.9324 | FFS2 | 1.0000 | |
| 8 | 0.000 | −5.708 | 31.102 | −32.165 | 36.9074 | FFS4 | 1.5300 | 55.8 |
| 9 | 0.000 | −48.075 | 14.954 | −72.726 | −47.9205 | FFS5 | −1.5300 | 55.8 |
| 10 | 0.000 | 1.248 | 23.783 | −80.517 | 27.3097 | FFS6 | −1.0000 | |
| 11 | 0.000 | 9.941 | 22.331 | −125.135 | ∞ | SPH | −1.4900 | 40.0 |
| 12 | 0.000 | 10.105 | 22.446 | −125.135 | ∞ | SPH | −1.0000 | |
| 13 | 0.000 | 5.965 | 36.117 | −156.149 | −26.0561 | CYL | −1.8810 | 41.0 |
| 14 | 0.000 | 9.691 | 37.864 | −144.503 | −255.8760 | CYL | −1.8470 | 23.8 |
| 15 | 0.000 | 11.695 | 39.618 | −158.538 | −22.6053 | CYL | −1.0000 | |
| 16 | 0.000 | 10.614 | 36.869 | −94.443 | ∞ | SPH | −1.5200 | 55.0 |
| 17 | 0.000 | 10.980 | 37.800 | −94.443 | ∞ | SPH | 1.5200 | 55.0 |
| 18 | 0.000 | 10.614 | 36.869 | −94.443 | ∞ | SPH | 1.0000 | |
| 19 | 0.000 | 11.695 | 39.618 | −158.538 | −22.6053 | CYL | −1.0000 | |
| 20 | 0.000 | 3.610 | 109.872 | −176.802 | ∞ | SPH | −1.4900 | 40.0 |
| 21 | 0.000 | 3.621 | 110.072 | −176.802 | ∞ | SPH | −1.0000 | |
| 22 | 0.000 | 3.621 | 110.072 | −176.802 | 0.0000 | SPH | −1.0000 | |

FFS1

| | | | |
|---|---|---|---|
| k: 9.3903e+002 | c5: 1.2002e−003 | c6: 2.3984e−003 | c10: 1.4107e−005 |
| c11: −1.6099e−005 | c12: −1.5947e−007 | c13: −6.4155e−007 | c14: −3.8504e−007 |
| c20: −2.9216e−009 | c21: −1.4444e−008 | c22: −1.8826e−008 | c23: 3.6832e−010 |
| c24: 1.0698e−010 | c25: −1.1054e−011 | c26: 7.1096e−013 | |

FFS2

| | | | |
|---|---|---|---|
| k: 7.9759e+000 | c5: −1.3260e−003 | c6: 2.1478e−004 | c10: −5.1152e−006 |
| c11: −4.4110e−005 | c12: 7.9044e−009 | c13: −1.1641e−007 | c14: 1.7888e−007 |
| c20: −5.4104e−009 | c21: 6.6724e−009 | c22: −2.0221e−008 | c23: −2.6088e−011 |
| c24: −2.1124e−010 | c25: 1.2064e−010 | c26: −1.4029e−011 | |

FFS3

| | | | |
|---|---|---|---|
| k: 9.1987e+000 | c5: 5.5722e−003 | c6: 2.0636e−005 | c10: 2.2323e−004 |
| c11: −2.0767e−004 | c12: −2.6109e−006 | c13: −5.0154e−006 | c14: −6.6069e−007 |
| c20: −1.2633e−007 | c21: 3.1399e−007 | c22: 1.0847e−007 | c23: 3.0837e−009 |
| c24: 4.2634e−009 | c25: −3.6393e−009 | c26: 1.0764e−009 | |

FFS4

| | | | |
|---|---|---|---|
| k: −1.5367e+000 | c5: −2.1876e−003 | c6: −1.8074e−002 | c10: −1.6835e−004 |
| c11: 5.4947e−004 | c12: −5.1652e−006 | c13: 3.0749e−006 | c14: −7.5309e−006 |
| c20: −5.4104e−009 | c21: 6.6724e−009 | c22: −2.0221e−008 | c23: −2.6088e−011 |
| c24: −2.1124e−010 | c25: 1.2064e−010 | c26: −1.4029e−011 | |

FFS5

| | | | |
|---|---|---|---|
| k: −2.6450e+000 | c5: −3.3695e−003 | c6: −2.8785e−004 | c10: −1.2451e−005 |
| c11: 2.0361e−006 | c12: −4.2276e−007 | c13: 7.4930e−008 | c14: −3.3484e−007 |
| c20: 1.2241e−008 | c21: 2.3330e−008 | c22: −1.9837e−008 | c23: −2.1860e−010 |
| c24: −3.5598e−010 | c25: 1.8071e−010 | c26: 1.4870e−010 | |

FFS6

| | | | |
|---|---|---|---|
| k: −2.8760e−001 | c5: −2.7303e−003 | c6: 2.2043e−003 | c10: 4.7779e−005 |
| c11: −2.9946e−004 | c12: 5.9794e−006 | c13: −7.2637e−007 | c14: −8.9796e−007 |
| c20: −4.0618e−009 | c21: 5.0966e−008 | c22: 5.2687e−008 | c23: −3.9971e−010 |
| c24: −2.4218e−009 | c25: −7.8968e−010 | c26: −8.0677e−010 | |
| FyT: −83.554 | FxT: −46.343 | FyR: 7.117 | FxR: 18.441 |
| \|FyR/FyT\| = 0.085 | | \|FxR/FxT\| = 0.3979 | |

As described above, according to Embodiments 1 to 3, it is possible to provide an optical system achieving a small size and display at a wide angle of view and preferable for use in a head mounted display, in which a required level of optical performance is ensured and occurrence of various optical aberrations can be suppressed at the same time. The optical system can be used to realize a head mounted display which is small and lightweight in its entirety and allows display at high resolution and at a wide angle of view.

While preferred embodiments have been described, it is to be understood that modification and variation of the present invention may be made without departing from the scope of the following claims.

What is claimed is:

1. An optical system which guides a displaying luminous flux from a display device to an eye of an observer, comprising:
    a first optical element and a second optical element in order from the side of an exit pupil of the optical system to the side of the display device,
    wherein a combined optical power provided by an emergent surface of the second optical element and an incident surface of the first optical element is a negative optical power, and the optical system forms an intermediate image with the displaying luminous flux in the first optical element; and
    wherein the first optical element includes at least a first surface which has a reflecting action and a second surface which reflects the displaying luminous flux reflected by the first surface back toward the first surface such that a central principal ray of the displaying luminous flux incident again on the first surface is reflected and travels in a direction substantially opposite to a reflecting direction in the previous reflection at the first surface with respect to a normal to the first surface at a hit point of the central principal ray.

2. The optical system according to claim 1, wherein the display device is a reflective display device,
    and the optical system further comprises a third optical element between the reflective display device and the second optical element.

3. The optical system according to claim 1, wherein the optical system forms a pupil image in an optical path of the displaying luminous flux in the first optical element.

4. The optical system according to claim 1, wherein the optical system forms a pupil image in an optical path of the displaying luminous flux in the second optical element.

5. The optical system according to claim 1, wherein at least one of the first and second optical elements includes a reflective surface decentered with respect to an optical path of the displaying luminous flux.

6. An image display apparatus comprising:
    a display device which forms an original image; and
    an optical system which guides a displaying luminous flux from the display device to an eye of an observer,
    wherein the optical system comprises a first optical element and a second optical element in order from the side of an exit pupil of the optical system to the side of the display device;
    wherein a combined optical power provided by an emergent surface of the second optical element and an incident surface of the first optical element is a negative optical power, and optical system forms an intermediate image with the displaying luminous flux in the first optical element; and
    wherein the first optical element includes at least a first surface which has a reflecting action and a second surface which reflects the displaying luminous flux reflected by the first surface back toward the first surface such that a central principal ray of the displaying luminous flux incident again on the first surface is reflected and travels in a direction substantially opposite to a reflecting direction in the previous reflection with respect to a normal to the first surface at a hit point of the central principal ray.

7. An optical system which guides a displaying luminous flux from a display device to an eye of an observer, comprising:
    a first optical element and a second optical element in order from the side of an exit pupil of the optical system to the side of the display device,
    wherein a combined optical power provided by an emergent surface of the second optical element and an incident surface of the first optical element is a negative optical power, and the optical system forms an intermediate image with the displaying luminous flux in the first optical element;
    wherein the first optical element reflects the displaying luminous flux a plurality of times by a reflective surface which is decentered with respect to an optical path of the displaying luminous flux; and
    wherein the optical system includes a case where an inner product which is formed between outer products each formed by a vector indicating incident light and a vector indicating reflected light in the respective reflections at the reflective surface is negative.

8. The optical system according to claim 7, wherein the display device is a reflective display device,
    and the optical system further comprises a third optical element between the reflective display device and the second optical element.

9. The optical system according to claim 7, wherein the optical system forms a pupil image in an optical path of the displaying luminous flux in the first optical element.

10. The optical system according to claim 7, wherein the optical system forms a pupil image in an optical path of the displaying luminous flux in the second optical element.

11. The optical system according to claim 7, wherein at least one of the first and second optical elements includes a reflective surface decentered with respect to an optical path of the displaying luminous flux.

12. An image display apparatus comprising:
    a display device which forms an original image; and
    an optical system which guides a displaying luminous flux from the display device to an eye of an observer,
    wherein the optical system comprises a first optical element and a second optical element in order from the side of an exit pupil of the optical system to the side of the display device;
    wherein a combined optical power provided by an emergent surface of the second optical element and an incident surface of the first optical element is a negative optical power, and optical system forms an intermediate image with the displaying luminous flux in the first optical element;
    wherein the first optical element reflects the displaying luminous flux a plurality of times by a reflective surface which is decentered with respect to an optical path of the displaying luminous flux; and
    wherein the optical system includes a case where an inner product which is formed between outer products each formed by a vector indicating incident light and a vector indicating reflected light in the respective reflections at their reflective surface is negative.

* * * * *